US008635527B2

(12) United States Patent
Saeki et al.

(10) Patent No.: US 8,635,527 B2
(45) Date of Patent: Jan. 21, 2014

(54) USER INTERFACE DEVICE, FUNCTION SETTING METHOD, AND COMPUTER PROGRAM PRODUCT

(75) Inventors: Iwao Saeki, Kanagawa (JP); Tetsuya Sakayori, Tokyo (JP); Takashi Yano, Tokyo (JP); Junichi Takami, Kanagawa (JP); Yoshinaga Kato, Kanagawa (JP); Haruo Shida, Kanagawa (JP); Yoshifumi Sakuramata, Tokyo (JP); Hiroko Mano, Tokyo (JP); Ryuichi Shimamura, Kanagawa (JP); Toshihiro Kobayashi, Kanagawa (JP); Akihiro Moriyama, Kanagawa (JP); Katsuhiko Fujita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1799 days.

(21) Appl. No.: 11/635,282

(22) Filed: Dec. 6, 2006

(65) Prior Publication Data

US 2007/0133015 A1 Jun. 14, 2007

(30) Foreign Application Priority Data

Dec. 12, 2005 (JP) ................................ 2005-358009
Oct. 26, 2006 (JP) ................................ 2006-290890

(51) Int. Cl.
*G06K 15/02* (2006.01)

(52) U.S. Cl.
USPC .......................................................... 715/255

(58) Field of Classification Search
USPC .......................................................... 715/255
See application file for complete search history.

(56) References Cited

U.S. PATENT DOCUMENTS 6,151,426 A * 11/2000 Lee et al. ...................... 382/319
6,281,983 B1 * 8/2001 Takahashi et al. ............. 358/1.2
6,590,584 B1 * 7/2003 Yamaura et al. .............. 715/704
6,718,059 B1 * 4/2004 Uchida ......................... 382/176
6,927,865 B1 * 8/2005 Kujirai et al. ................ 358/1.12
7,164,486 B1 * 1/2007 Nakamura et al. ........... 358/1.15
2002/0081040 A1 * 6/2002 Uchida ......................... 382/311
2005/0105129 A1 * 5/2005 Takahashi ..................... 358/1.15
2005/0246643 A1 * 11/2005 Gusmorino et al. .......... 715/734

FOREIGN PATENT DOCUMENTS

JP 2002-84389 3/2002
JP 2002-112022 4/2002
JP 2002-312777 10/2002
JP 2003-330656 11/2003

(Continued)

OTHER PUBLICATIONS

Sep. 20, 2011 Japanese official action in connection with a counterpart Japanese patent application.

(Continued)

*Primary Examiner* — Doug Hutton, Jr.
*Assistant Examiner* — Zaida I Marrero
(74) *Attorney, Agent, or Firm* — Cooper & Dunham LLP

(57) ABSTRACT

An input image is analyzed into document components. Preview data of the input image is generated based on a result of analysis. A function item that can be processed on the input image is selected based on the result of analysis. A function item is specified from among function items displayed on an operation display unit. A target area for specified function item is displayed together with the preview data on the operation display unit. A target area is specified from among target areas displayed on the operation display unit. New preview data that reflects the specified function item processed on specified target area is generated, and output to the operation display unit.

14 Claims, 13 Drawing Sheets

(56) References Cited

FOREIGN PATENT DOCUMENTS

| | | |
|---|---|---|
| JP | 2005-72818 | 3/2005 |
| JP | 2005-115683 | 4/2005 |
| JP | 2005-341216 | 12/2005 |
| JP | 2006-3568 | 1/2006 |

OTHER PUBLICATIONS

English translation of May 10, 2011 Japanese official action in connection with a counterpart Japanese patent application.

* cited by examiner

FIG. 4

| FUNCTION | SETTING AREA (COORDINATES OF TOP-LEFT AND BOTTOM-RIGHT) |
|---|---|
| STAPLE | (0, 0) (40, 40) |
| | (120, 0) (160, 40) |
| PUNCH | (0, 40) (40, 270) |
| | (40, 0) (200, 40) |
| BINDING MARGIN ADJUSTMENT | |

USER INTERFACE DEVICE, FUNCTION SETTING METHOD, AND COMPUTER PROGRAM PRODUCT

CROSS-REFERENCE TO RELATED APPLICATIONS

The present document incorporates by reference the entire contents of Japanese priority documents, 2005-358009 filed in Japan on Dec. 12, 2005 and 2006-290890 filed in Japan on Oct. 26, 2006.

BACKGROUND

1. Technical Field

This disclosure generally relates to a technology for editing an image using an electronic apparatus equipped with an operation display unit.

2. Description of the Related Art

An image forming apparatus such as a digital multifunction product (MFP) has a touch panel, on which information, such as an operational setting screen and a document state to be output, is displayed. However, when a size of the touch panel is small, it is difficult for a user to operate the image forming apparatus on the touch panel.

To solve the above problem, Japanese Patent Laid-open No. 2002-112022 discloses an image forming technique in which an image read by a scanner is divided into areas, such as a text area, a photo area, a drawing area, and a background area, so that a user selects and specifies a target area. When a target area-selection key is pressed, a screen for specifying parameters concerning density or color-tone adjustment is displayed for each selected area, and the density or color-tone adjustment is performed on the image based on the specified parameters to form an adjusted image.

The above technique is effective in improving user-friendliness, because a user can select a desired operation from a selection menu on a setting screen for specifying parameters for each image area.

Although the above technique has the advantage in setting parameters through a touch-panel screen, the user can hardly check a final layout and a final document state before the image is actually printed, because how the edited image will be output is not displayed.

Some users like an operational procedure in which a function menu is displayed first so that the user selects a target function, before specifying a target area. However, the above technique does not satisfy such needs.

BRIEF SUMMARY

In an aspect of this disclosure, there is provided a method for setting a function, including analyzing an input image into document components; generating preview data of the input image based on a result of analysis at the analyzing, and outputting generated preview data to an operation display unit that displays an image thereon and receives an instruction for specifying a position on displayed image; selecting a function item that can be processed on the input image based on the result of analysis at the analyzing, and outputting selected function item to the operation display unit; receiving a specification of a function item from among function items displayed on the operation display unit; displaying a target area for specified function item together with the preview data on the operation display unit; receiving a specification of a target area from among target areas displayed on the operation display unit; and generating new preview data that reflects the specified function item processed on specified target area, and outputting generated new preview data to the operation display unit.

In another aspect, there is provided a method for setting a function, including analyzing an input image into document components; generating preview data of the input image based on a result of analysis at the analyzing, and outputting generated preview data to an operation display unit that displays an image thereon and receives an instruction for specifying a position on displayed image; displaying a target area for a function item that can be processed on the input image based on the result of analysis at the analyzing together with the preview data on the operation display unit; receiving a specification of a target area from among target areas displayed on the operation display unit; selecting a function item that can be processed on the input image based on specified target area, and outputting selected function item to the operation display unit; receiving a specification of a function item from among function items displayed on the operation display unit; and generating new preview data that reflects specified function item processed on the specified target area, and outputting generated new preview data to the operation display unit.

In another aspect of this disclosure, there is provided a method for setting a function, including switching selectively between a first operation displaying mode and a second operation displaying mode. The first operation displaying mode includes analyzing an input image into document components; generating preview data of the input image based on a result of analysis at the analyzing, and outputting generated preview data to an operation display unit that displays an image thereon and receives an instruction for specifying a position on displayed image; selecting a function item that can be processed on the input image based on the result of analysis at the analyzing, and outputting selected function item to the operation display unit; receiving a specification of a function item from among function items displayed on the operation display unit; displaying a target area for specified function item together with the preview data on the operation display unit; receiving a specification of a target area from among target areas displayed on the operation display unit; and generating new preview data that reflects the specified function item processed on specified target area, and outputting generated new preview data to the operation display unit. The second operation displaying mode includes analyzing an input image into document components; generating preview data of the input image based on a result of analysis at the analyzing, and outputting generated preview data to an operation display unit that displays an image thereon and receives an instruction for specifying a position on displayed image; displaying a target area for a function item that can be processed on the input image based on the result of analysis at the analyzing together with the preview data on the operation display unit; receiving a specification of a target area from among target areas displayed on the operation display unit; selecting a function item that can be processed on the input image based on specified target area, and outputting selected function item to the operation display unit; receiving a specification of a function item from among function items displayed on the operation display unit; and generating new preview data that reflects specified function item processed on the specified target area, and outputting generated new preview data to the operation display unit.

The above and other aspects, features, advantages and technical and industrial significance will be better understood by reading the following detailed description of presently preferred embodiments, when considered in connection with the accompanying drawings.

BRIEF DESCRIPTION OF THE DRAWINGS

FIG. 4 is a function relational table for explaining relations between the functions and the setting areas;

DETAILED DESCRIPTION OF THE PREFERRED EMBODIMENTS

Exemplary embodiments of the present invention are described in detail below with reference to the accompanying drawings.

Figure 1:
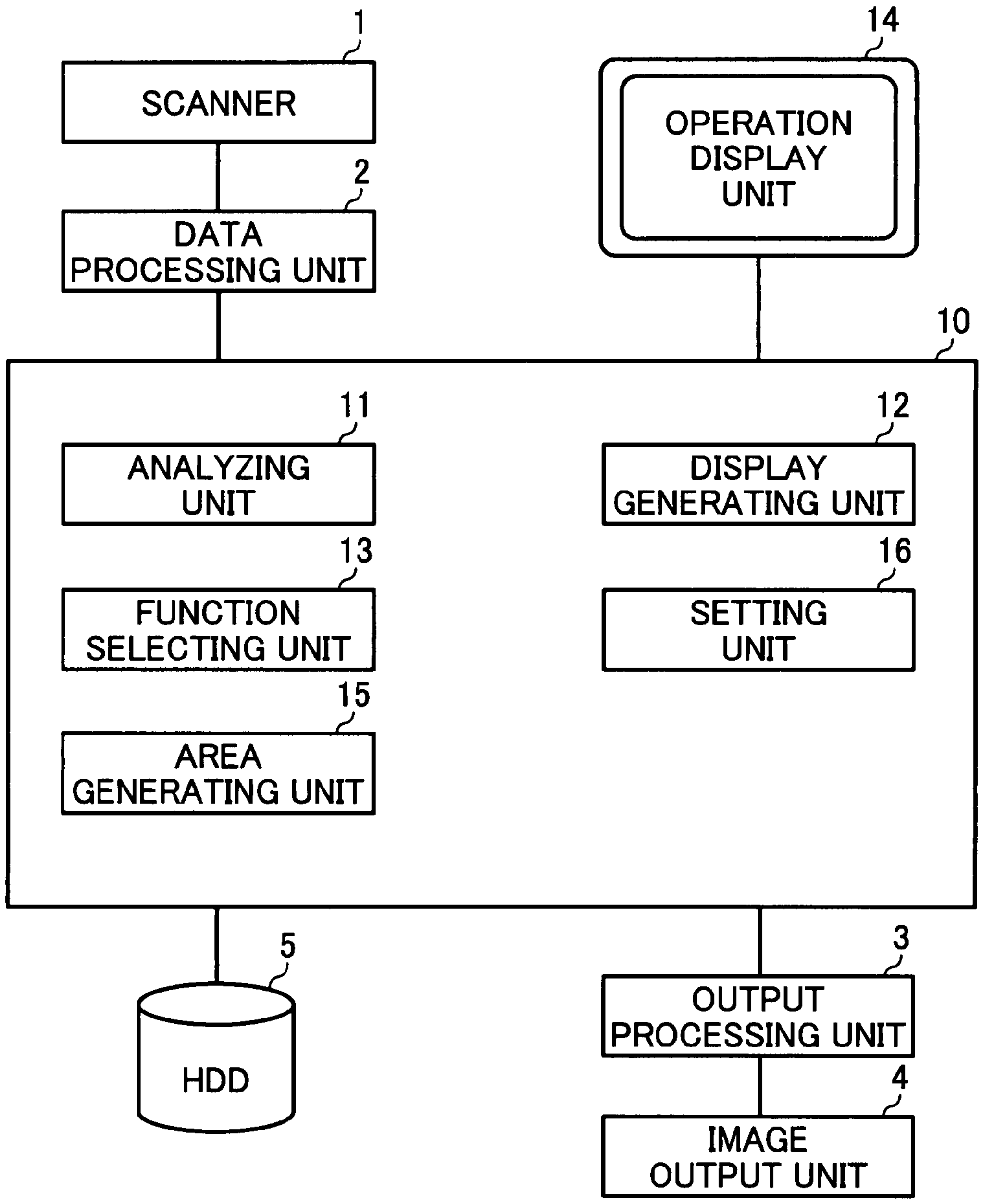
FIG. 1 is a functional block diagram of an image forming apparatus including a user interface device according to a first embodiment of the present invention.

FIG. 1 is a functional block diagram of an image forming apparatus including a user interface device 10 according to the first embodiment. The image forming apparatus includes a scanner 1, an image processing unit 2, an output processing unit 3, an image output unit 4, a memory (hard disk drive (HDD)) 5, and the user interface device 10.

The scanner 1 reads an original image. The image processing unit 2 converts the original image into digital data to create image data and sends the image data to the user interface device 10. The user interface device 10 causes various settings acceptable by displaying the image data. The output processing unit 3 processes the image data based on a result of the settings accepted by the user interface device 10. The output processing unit 3 also performs various types of image processing such as gamma correction. The image output unit 4 outputs an image based on the image data processed by the output processing unit 3.

The user interface device 10 includes an analyzing unit 11, a display generating unit 12, a function selecting unit 13, an operation display unit 14, an area generating unit 15, and a setting unit 16.

The analyzing unit 11 analyzes the input data into document components. The display generating unit 12 generates preview data based on a result of the analysis by the analyzing unit 11 to output the preview data on the operation display unit 14. The display generating unit 12 also generates an edited preview data by reflecting a specified function. The function selecting unit 13 selects functions, based on the result of the analysis by the analyzing unit 11, available for the input data. The operation display unit 14 displays the preview data generated by the display generating unit 12. The area generating unit 15 causes the operation display unit 14 to display available areas in the preview corresponding to the function accepted by the operation display unit 14. The setting unit 16 receives an instruction for specifying a target function out of the displayed functions by displaying details of the functions selected by the function selecting unit 13. The setting unit 16 also receives an instruction for selecting one of the available areas displayed by the operation display unit 14 and the area generating unit 15, and sets parameters as the specified function is performed at the specified area.

The user interface device 10 acquires image data, receives an instruction for specifying a target function by displaying available functions, and receives an instruction for specifying a target area by displaying available areas corresponding to the specified function. This type of operation displaying mode is called "a first interface mode (a first operation displaying mode)". The user interface device 10, which is executed in the first interface mode, receives a first instruction for executing a target function at a target area in input data, and receives a second instruction for specifying a target function and a target area through an edited preview of the operation display unit 14, which reflects the first instruction.

The analyzing unit 11 analyzes input data to recognize each part of the image data as any one of four image types; a text type, a photo part, a drawing part, and other type. The analyzing unit 11 also divides the input data based on a result of an analysis. For example, the texts are divided into paragraphs, and each piece of photos and drawings is recognized independently.

The analyzing unit 11 divides input data using the well-known technique. When the analyzing unit 11 determines that parts analyzed as the text type is placed in a series, it is possible to divide the parts by recognizing as a text area. When the analyzing unit 11 detects that parts with half tone pixels are placed in a series, it is possible to divide the parts by recognizing as a photo area. When the analyzing unit 11 detects parts containing an edge and with extremely different densities, it is possible to divide the parts by recognizing as a drawing area. Other parts are divided by recognized as other than text, picture, and drawing areas. Detail description of the well-known technique is omitted.

The display generating unit 12 generates preview data based on a result of analysis by the analyzing unit 11. The preview can be displayed in a form that a layout of the document for each page is edged with a line, or each area is edged with a line. The display generating unit 12 generates preview data to be displayed for each page layout or for each area, and causes the operation display unit 14 to display the preview data.

The display generating unit 12 also generates an edited preview data based on parameters set by the setting unit 16, and causes the operation display unit 14 to display the edited preview data.

The display generating unit 12 generates, as a default, preview data based on input data not performed any process. The default can be changed according to user's usability so that, for example, preview data based on input data after processed stapling at the left corner is displayed.

The function selecting unit 13 selects available functions based on a result of analysis by the analyzing unit 11. When input data is determined to be monochrome, the function selecting unit 13 sets some functions concerning color settings not available. When a document read by the scanner 1 is book shaped and a black border line appears, the analyzing unit 11 detects the border line and the function selecting unit 13 sets erase available. The function selecting unit 13 selects available functions based on a result of analysis by the analyzing unit 11, and sets unnecessary functions not available.

Figure 2:
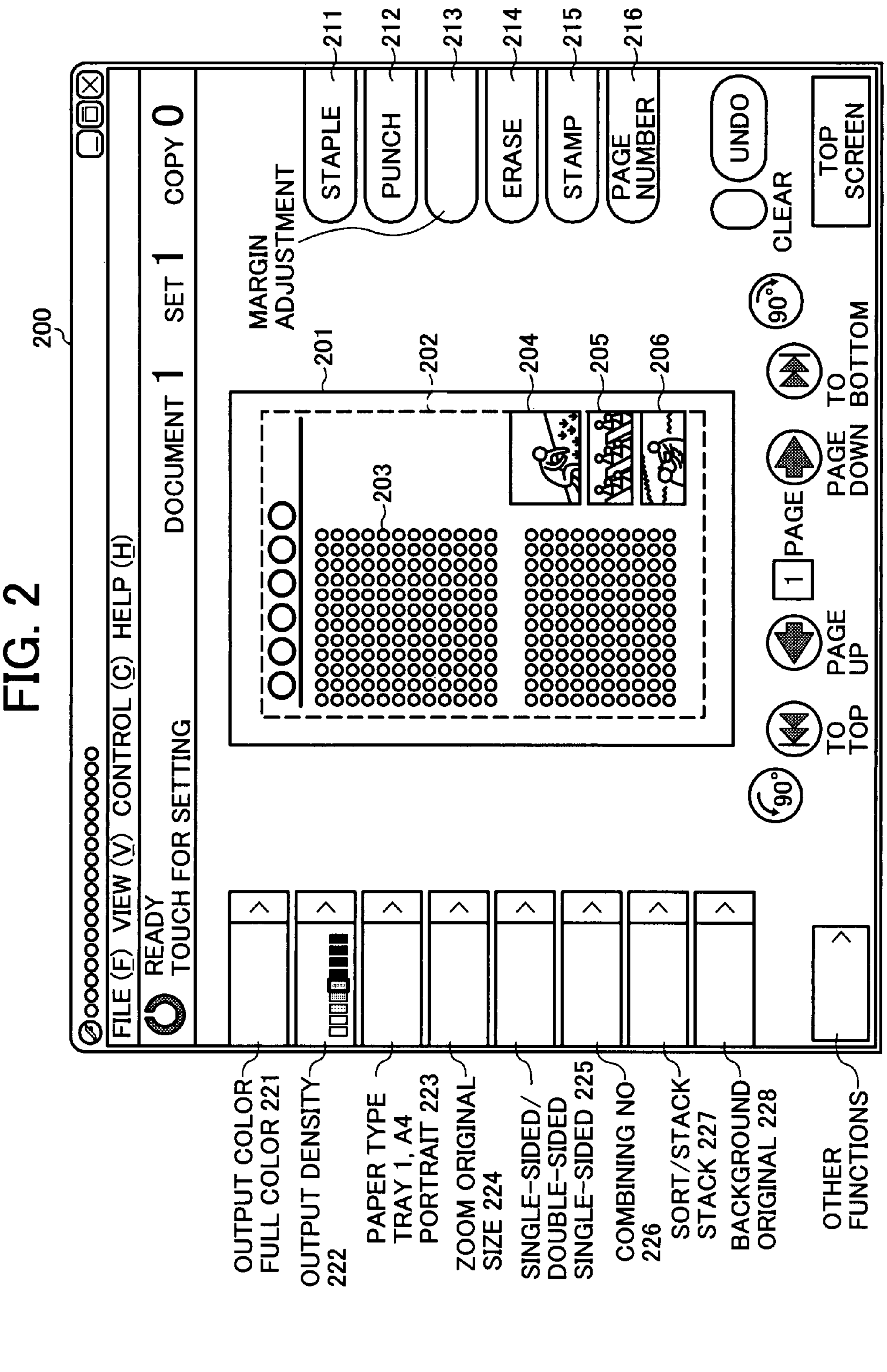
FIG. 2 is a schematic for explaining an example of a screen of an operation display unit, on which input data and available function items are displayed.

FIG. 2 is a schematic for explaining an example of a screen of the operation display unit 14, on which input data and available function items are displayed. An image 201 based on image data read from a document is displayed on a screen 200 of the operation display unit 14. The image 201 includes a frame 202 representing a read-data range, a text area 203, and photo areas 204 to 206.

The function selecting unit 13 selects available functions of staple 211, punch 212, margin adjustment 213, erase 214, stamp 215, and page number 216, and displays the functions in the right side of the screen 200.

The function selecting unit 13 also selects available functions of output color 221, density 222, paper size 223, zoom 224, single-sided/double-sided 225, combining 226, sort/stack 227, and background 228, and displays the functions in the left side of the screen 200.

The operation display unit 14 receives various instructions concerning settings from a user such as specifying a target function and a target area. The user uses a touch-input device, for example a fingertip or a stylus pen, for inputting parameters to the operation display unit 14. The operation display unit 14 detects a position where the pointer indicates within a panel screen and receive an instruction corresponding to the position using a well-known technique such as the resistive system, in which a change of resistant is detected by sensing a pressing force generated when a fingertip or a point of a pen touches on a screen, or the capacitive system. Although the touch input system is employed in the operation display unit 14 according to the present embodiment, another input system can be employed, such as a system using a mouse or a keyboard.

Figure 3:
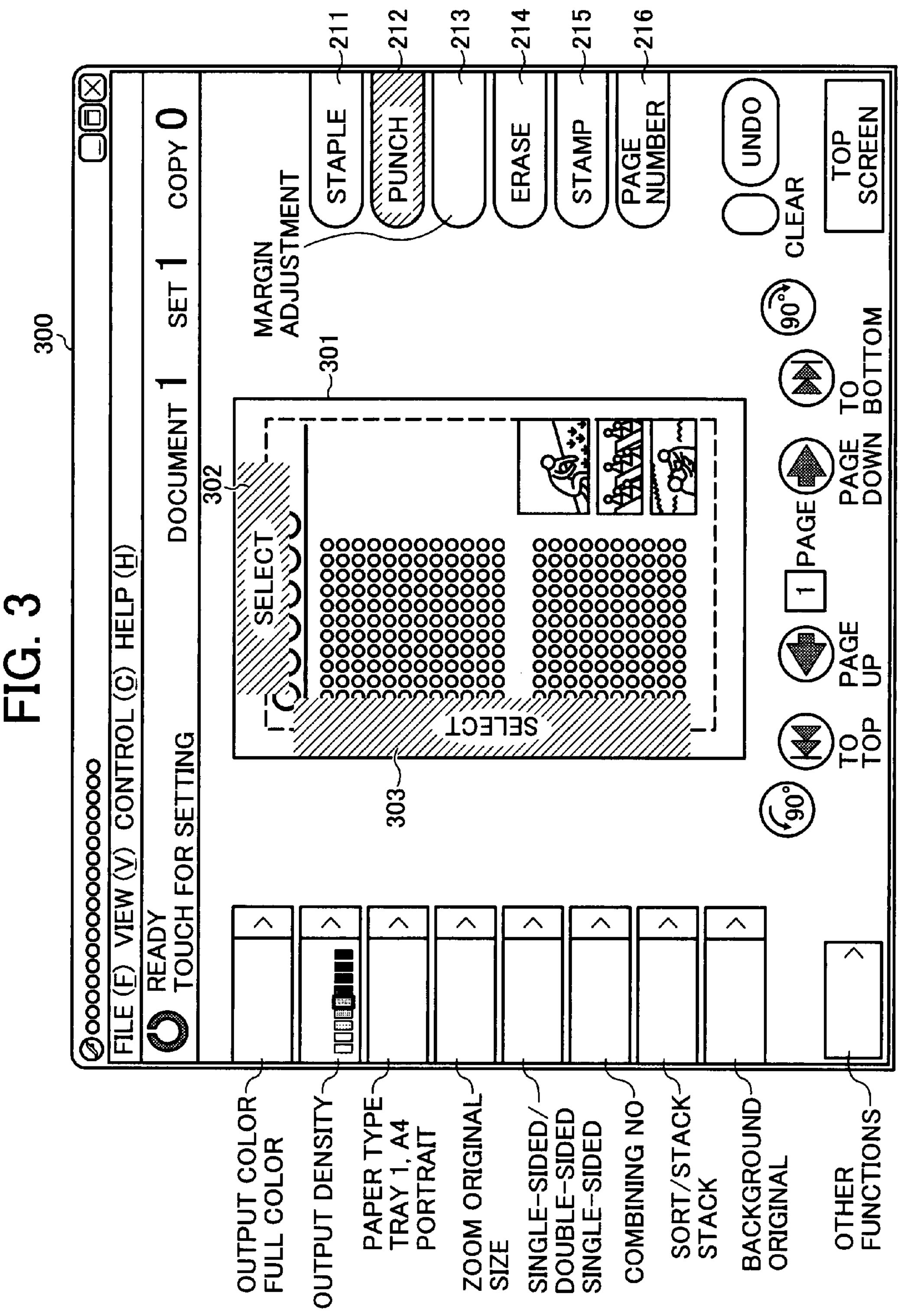
FIG. 3 is a schematic for explaining an example of a screen of the operation display unit when one of the function items is selected.

FIG. 3 is a schematic for explaining an example of the screen 200 of the operation display unit 14 when one of the function items is selected. FIG. 4 is a function relational table for explaining relations between the functions and the setting areas. The punch 212 is selected out of the function items through a touch-input operation.

When the operation display unit 14 detects a touch-input operation at the punch 212, the area generating unit 15 reads available area corresponding to the punching from the function relational table as shown in FIG. 4, and displays punch-hole areas 302 and 303 on the operation display unit 14. The punch-hole areas 302 and 303 can be either overlapped or overwritten. Various display patterns can be accepted such as turning target areas to another color, making target areas blink or darkening areas other than target areas.

The user specifies a target area, i.e. the punch-hole area 303, by touching the punch-hole area 303 in FIG. 3. The operation display unit 14 receives the touch-input operation from the punch-hole area 303. The setting unit 16 sets parameters for executing punching at the specified area.

The display generating unit 12 generates an edited preview data based on a result of settings by the setting unit 16, and causes the operation display unit 14 to display the edited preview. The display generating unit 12 receives another change, like a correction, from the edited preview. Another edited preview is displayed after setting parameters to reflect the change. When no more change is received, a print-executing operation is received.

When a print-executing operation is received, the setting data by the setting unit 16 is sent to the output processing unit 3. The image output unit 4 outputs an image based on output data processed by the output processing unit 3.

As described above, the user interface device 10 receives various instructions for settings from a user in the first interface mode.

Figure 5:
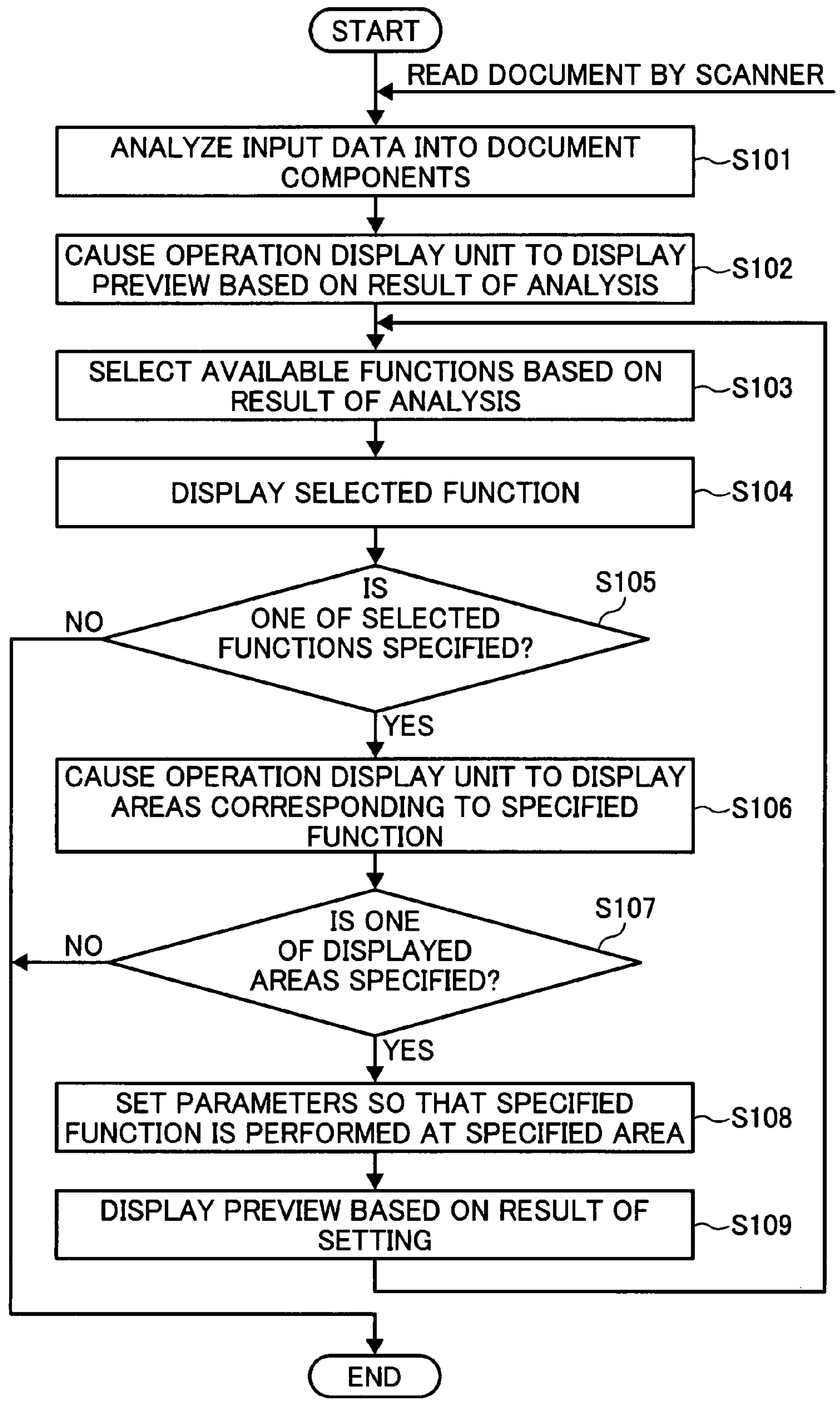
FIG. 5 is a flowchart of a setting procedure for the user interface device according to the first embodiment.

FIG. 5 is a flowchart of a setting procedure by the user interface device 10. Although input data is obtained through reading of a document by the scanner 1, it is acceptable to obtain input data via a network or to input document data via a recording medium.

The analyzing unit 11 analyzes obtained input data into document components. As for the analysis, it is allowable to employ the well-known techniques such as detection of histogram change, detection of an edge, and character recognition (step S101).

The display generating unit 12 causes the operation display unit 14 to display a preview screen, based on a result of the analysis by the analyzing unit 11. As shown in FIG. 2, the preview screen includes frames, which causes areas easy to understand, for representing a paper range and an image-data range (step S102).

The function selecting unit 13 selects functions available for the input data based on the result of the analysis. Because some functions cannot be performed to image data, it is effective to display available function items only by removing unnecessary items. When monochrome data is input, function items concerning color settings will be disabled. When detected margin width is larger than a threshold, punching and margin adjustment are selected as priority function items (step S103).

The operation display unit 14 displays information on functions selected by the function selecting unit 13. For a display example, see the function items from the staple 211 to the page number 216 and from the output color 221 to the background 228 in FIG. 2 (step S104).

The operation display unit 14 receives an instruction for specifying by a user of a target function out of the displayed function items. Although it is preferable to receive an instruction through a touch-input operation, it is acceptable to receive an instruction through an operation using an input device, such as a mouse or a keyboard (step S105).

When the operation display unit 14 receives an instruction for specifying a target function (Yes at step S105), the area generating unit 15 causes the operation display unit 14 to display available areas in a preview screen corresponding to the specified function. When punching is selected, available areas corresponding to the punching are found by referring to the function relational table in FIG. 4 to be the punch-hole area 302 defined by coordinates (40, 0) and (200, 40) and the punch-hole area 303 defined by coordinates (0, 40) and (40, 270). As shown in FIG. 3, the punch-hole areas 302 and 303 are displayed as the areas corresponding to the specified function (step S106).

The operation display unit 14 does not receive an instruction for specifying a target function (No at step S105), the process ends, and another process will start, such as printing an image.

The operation display unit 14 detects whether one of the punch-hole areas 302 and 303 is selected (step S107). When the operation display unit 14 receives an instruction for selecting a target area, i.e., the punch-hole area 303 (Yes at step S107), the setting unit 16 sets parameters so that the function specified at step S105 is performed at the area received by the operation display unit 14 at step S107 (step S108).

When the operation display unit 14 does not receive an instruction for specifying a target area (No at step S107), the process ends, and another process will start, such as printing an image.

The display generating unit 12 generates an edited preview data based on a result of the settings by the setting unit 16 and causes the operation display unit 14 to display the edited preview (step S109). The process goes to the step S103, at which the function selecting unit 13 selects available functions, and the onward steps from S103 are repeated. By repeating the above steps, the user can edit settings repeatedly until a desired result is obtained.

When the operation display unit 14 does not receive an instruction for specifying a target function or a target area (No at step S105 or No at step S107), the process ends, and another process will start, such as printing an image.

The process described above enables a user to make settings so that a target function is performed at a target area in the first interface mode.

The user interface device 10 first displays a setting menu. When a user selects a target function item from the setting menu, the user interface device 10 displays available areas corresponding to the specified function. This easy-to-understand procedure enables a user to make a series of smooth operations. Therefore, the present invention provides a user-friendly and easy-to-operate user interface device.

When a user issues an instruction for specifying a target function, the operation display unit 14 receives the instruction. The operation display unit 14 receives an instruction including textural information, by displaying a screen with a function for which alphabets are input (not shown). The function selecting unit 13 selects a function corresponding to the instruction. The operation display unit 14 displays the selected function to receive another instruction.

To specify a target area, the user preferably inputs numerical information via the operation display unit 14. The area generating unit 15 generates area data from the numerical information and causes the operation display unit 14 to display the area data.

A user inputs information on a target function and a target area with a manual operation in the modification. Therefore, it is possible to specify parameters concerning a target function and a target area more precisely.

In a user interface device 20 according to a second embodiment, unlike in the user interface device 10, the area generating unit 15 causes the operation display unit 14 to display areas available for a function based on a result of the analysis. Next, the operation display unit 14 receives an instruction for specifying a target area out of the displayed areas. The function selecting unit 13 selects functions available for the specified area. The operation display unit 14 receives an instruction for specifying a target function by displaying the selected function items.

The operation display unit 14 receives an instruction for specifying a target area first and an instruction for specifying a target function secondly, by displaying available areas first and available functions secondly. The setting unit 16 sets parameters so that the specified function is performed at the specified area. A functional block diagram of the user interface device 20 is identical to that of the user interface device 10. Therefore, the functional block diagram of the user interface device 20 is omitted from the drawings.

The user interface device 20 receives an instruction for specifying a target area by displaying areas available for a function, before receiving an instruction for specifying a target function by displaying functions available for the specified area. This type of operation displaying mode is called "a second interface mode (a second operation displaying mode)".

Figure 6:
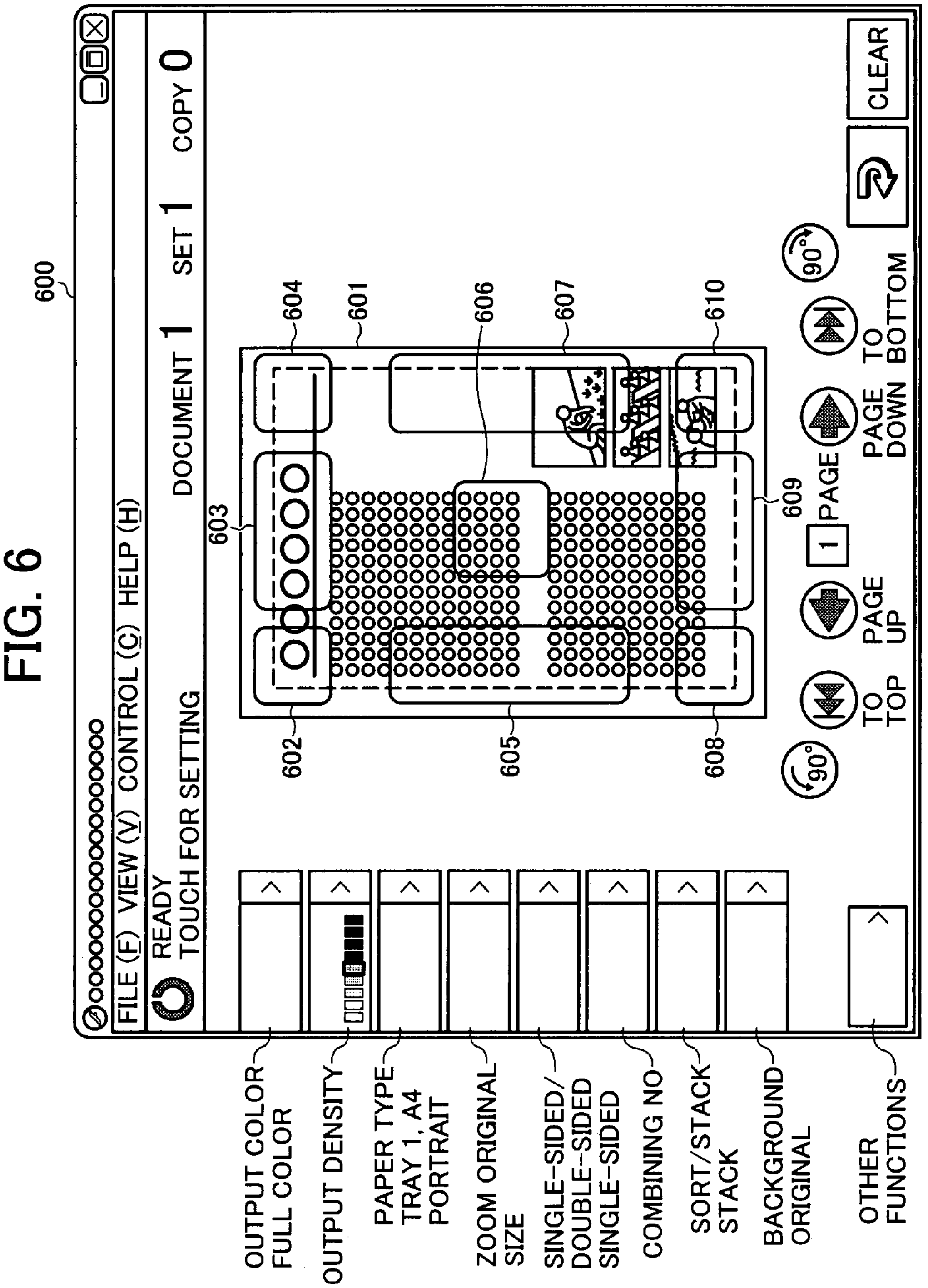
FIG. 6 is a schematic for explaining an example of a screen displayed by a user interface device according to a second embodiment of the present invention.
Figure 7:
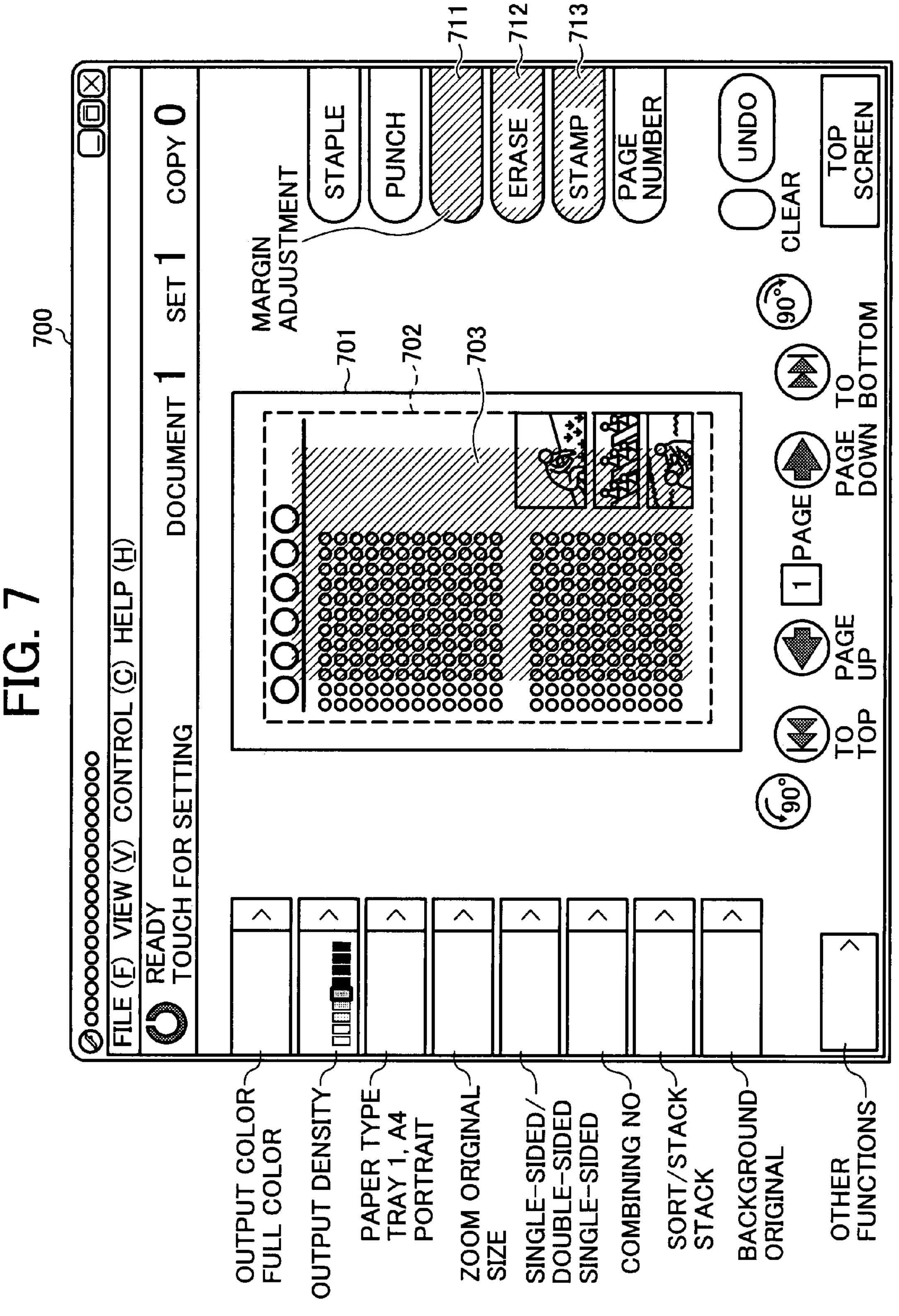
FIG. 7 is a schematic for explaining an example of a screen, on which function items available for a specified area are displayed when a target area shown in FIG. 6 is specified.
Figure 8:
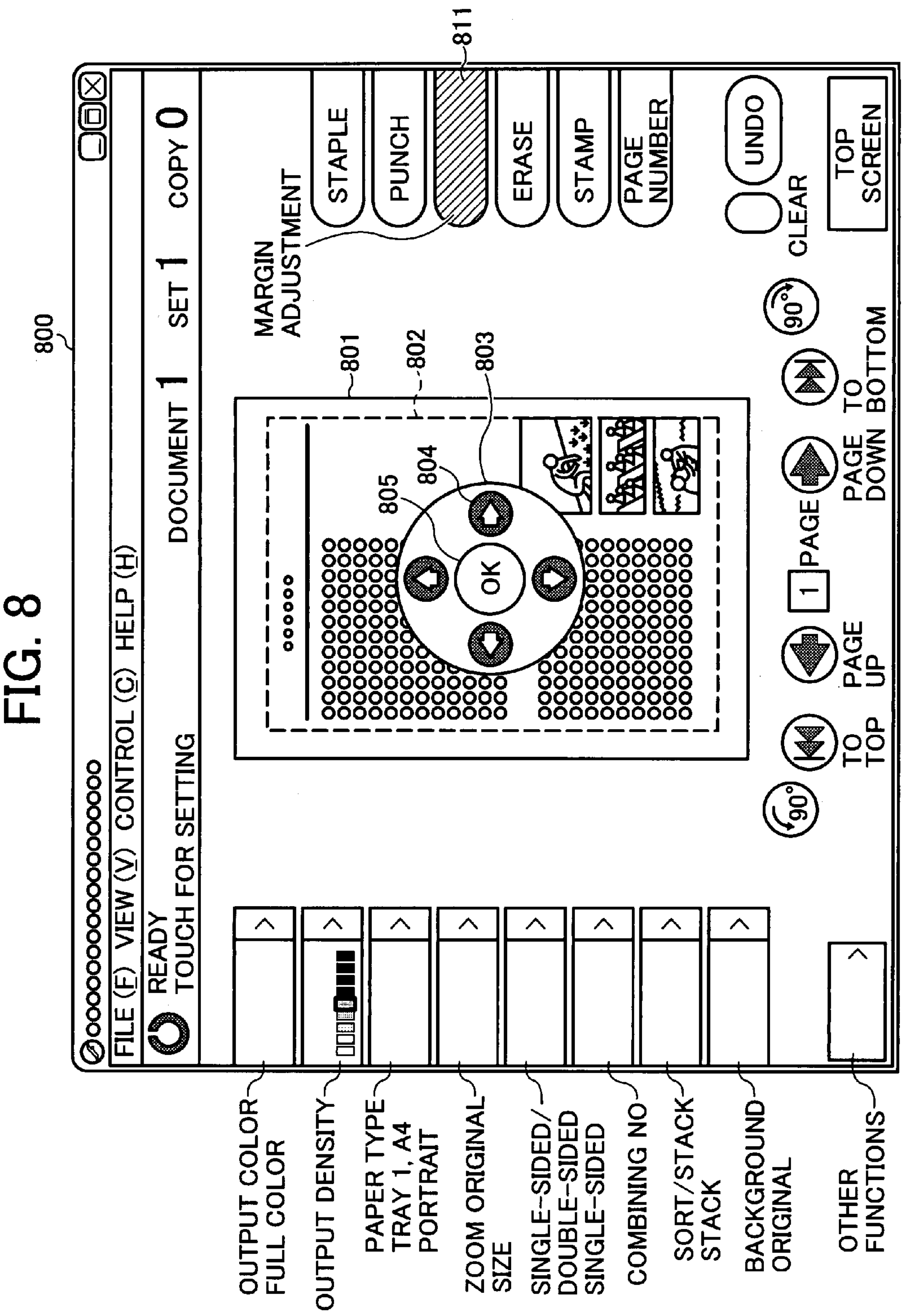
FIG. 8 is a schematic for explaining an example of a screen when one of the available function items displayed in FIG. 7 is selected.
Figure 9:
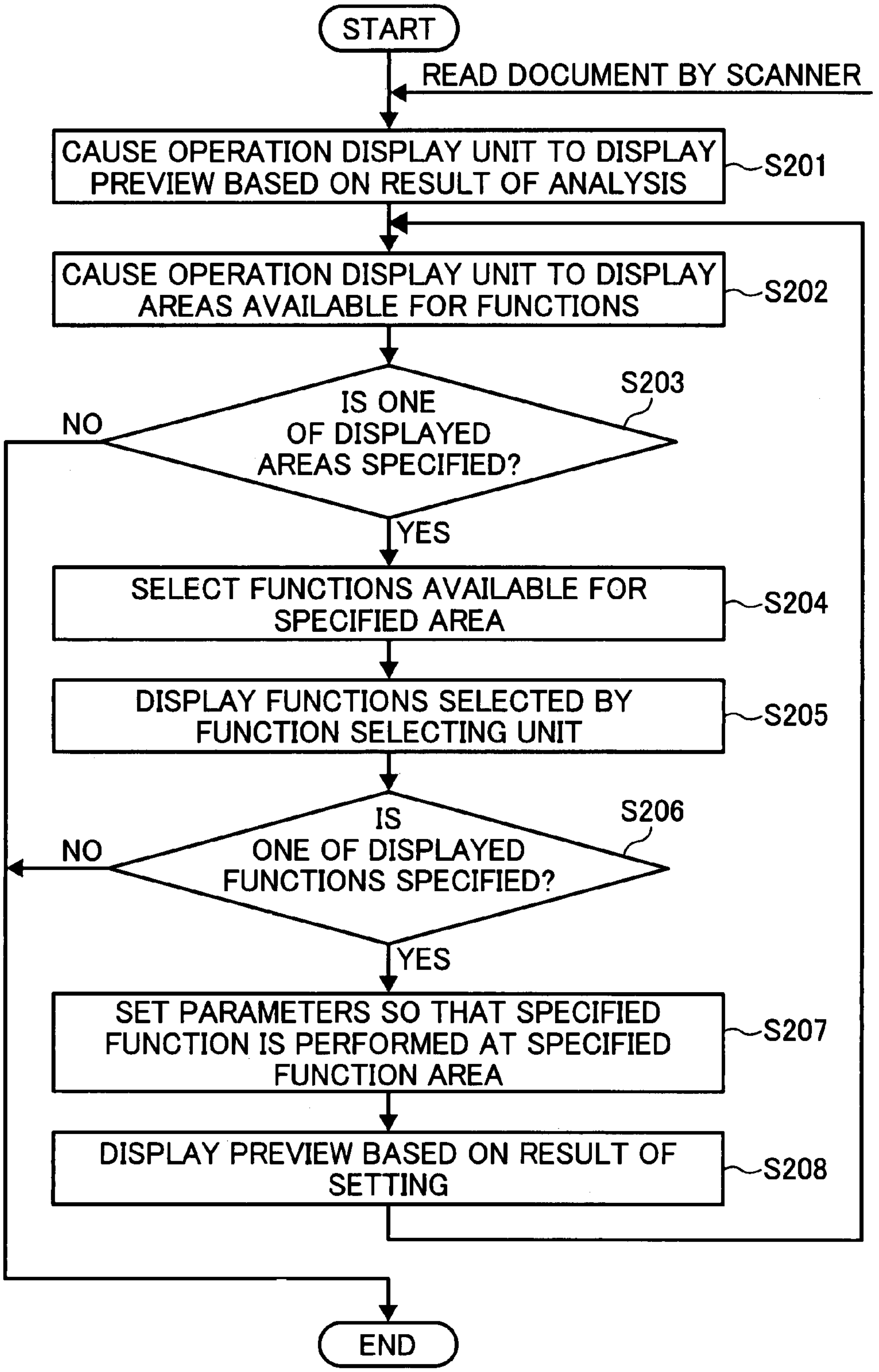
FIG. 9 a flowchart of a setting procedure for the user interface device according to the second embodiment.

FIG. 6 is a schematic for explaining an example of a screen displayed by the user interface device 20. FIG. 7 is a schematic for explaining an example of a screen, on which function items available for a specified area are displayed when a target area is specified. FIG. 8 is a schematic for explaining an example of a screen when one of the available function items is selected. FIG. 9 is a flowchart of a setting procedure by the user interface device 20. With reference to FIGS. 6 to 9, the setting procedure by the user interface device 20 is described below.

The display generating unit 12 causes the operation display unit 14 to display a preview based on a result of the analysis by the analyzing unit 11 (step S201). The area generating unit 15 generates area data for displaying areas available for a function based on the result of the analysis. The operation display unit 14 displays the areas available for a function based on the area data. As shown in FIG. 6, areas 602 to 610, which are available for a function, are displayed on a screen 600 of the operation display unit 14 (step S202).

When a user touches one of the areas 602 to 610, the operation display unit 14 receives an instruction for specifying the touched area (step S203). When the target area, i.e., the area 606, is selected (Yes at step S203), the function selecting unit 13 selects functions available for the area 606 by referring to the function relational table (step S204). The operation display unit 14 displays the selected function items on a screen 700 (see FIG. 7). The selected function items for the area 606 are margin adjustment 711, erase 712, and stamp 713.

Available function items can be selected, for example, by referring to the function relational table shown in FIG. 4. The selected function items are displayed on the right side of the screen. Some functions not available for the selected area, such as staple, can be darkened or invisible (step S205).

When the margin adjustment 711 is selected out of the function items displayed on the operation display unit 14 (Yes at step S206), the area generating unit 15 generates an edited preview data and causes the operation display unit 14 to display the edited preview data. An edited preview screen appears as shown in FIG. 8. To make clear which function item is selected, the selected item, i.e., margin adjustment 811, can be highlighted or items other than the margin adjustment 811 can be invisible.

When the margin adjustment 811 is selected, the area generating unit 15 displays the area to be processed (see FIG. 8). The display generating unit 12 generates an icon 803, for which a screen 802 moves from left to right or up to down. The operation display unit 14 displays the icon 803 to receive an instruction for moving or specifying a position of the screen 802.

The setting unit 16 receives an instruction for specifying a target area in the flow described above, submits functions available for the received area, and receives an instruction for specifying a target function out of the submitted functions (step S207).

The user interface device 20 displays areas available for a function first. When a user selects a target area, the user interface device 20 displays a function menu with function items available for the selected area. The user selects a target function from the function menu. This easy-to-understand procedure, i.e., to select a target area first and a target function secondly, enables a user to make a series of smooth operations. Therefore, the present invention provides a user-friendly and easy-to-operate user interface device.

Figure 10:
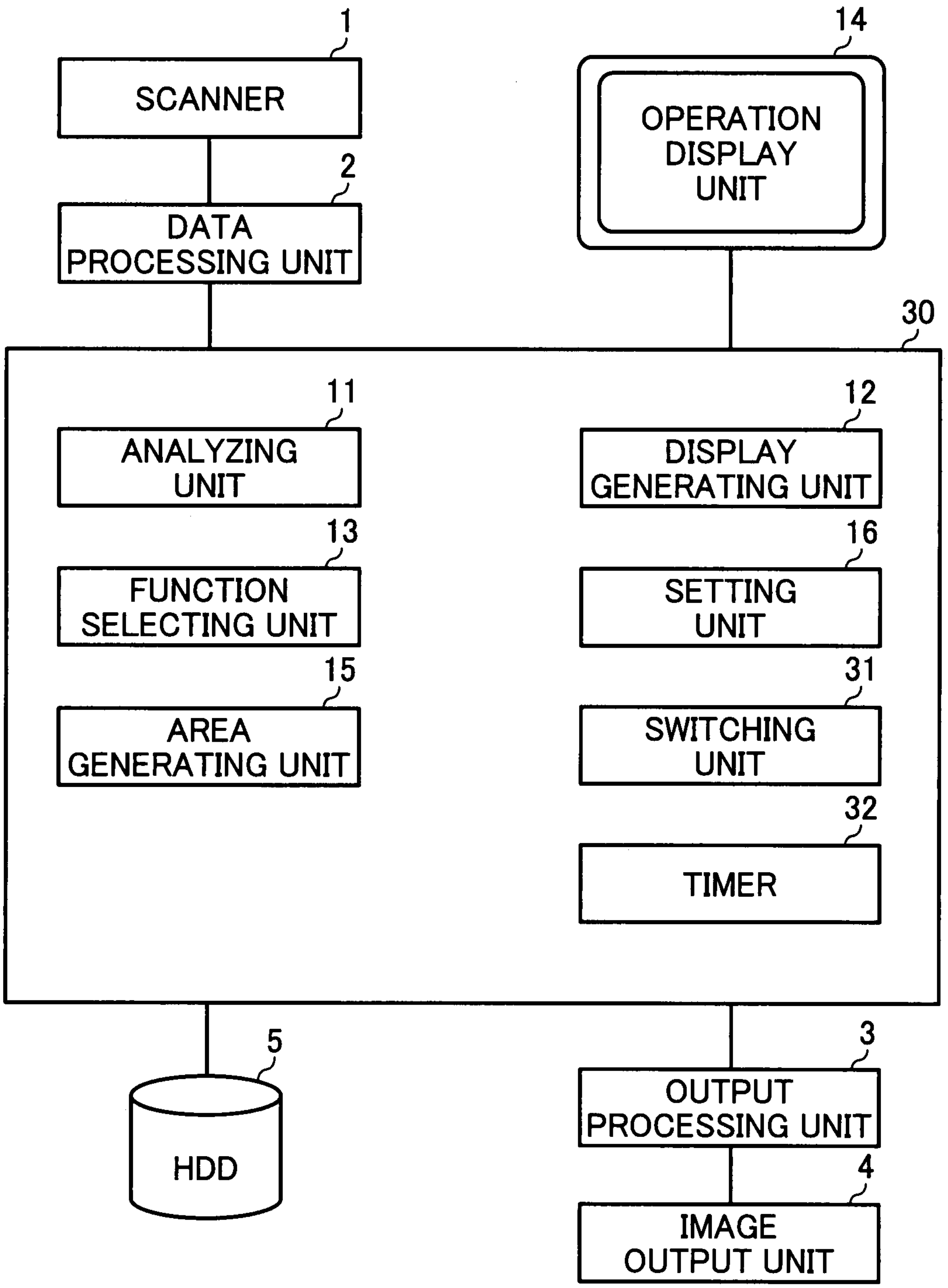
FIG. 10 is a functional block diagram of an image forming apparatus including a user interface device according to a third embodiment of the present invention.

FIG. 10 is a functional block diagram of an image forming apparatus including a user interface device 30 according to a third embodiment.

In addition to components of the user interface device 10 or 20, the user interface device 30 further includes a switching unit 31 for switching between the first interface mode (the first operation displaying mode) and the second interface mode (the second operation displaying mode). The operation display unit 14 displays a screen in response to the selected mode.

It is preferable that the switching unit 31 receives from a user of an instruction for switching between the first interface mode and the second interface mode. The switching unit 31 can be displayed and arranged on a screen in a form of an icon displayed on the operation display unit 14 or a selection menu (not shown).

The user interface device 30 enables a user to perform setting operations in a desired mode by switching between the first interface mode and the second interface mode.

The user interface device 30 receives user settings from any modes of the first interface mode and the second interface mode. Therefore, the present invention provides a user-friendly and easy-to-understand user interface device.

The user interface device 30 includes a timer 32 for measuring time. The switching unit 31 switches between the first interface mode and the second interface mode depending on time, which the timer 32 measures. For example, the switching unit 31 switches screens for the first interface mode and the second interface mode every 10 seconds.

The switching unit 31 displays a screen for the first interface mode for 10 seconds. When no instruction for settings is received within the period, the switching unit 31 switches to a screen for the second interface mode. When an instruction for setting is received within the period, the switching unit 31 keeps the screen for the first interface mode.

With the modification, the switching unit 31 switches to the other mode, when a user does not input within a predetermined period. Therefore, the present invention provides a user-friendly and easy-to-understand user interface device.

Figure 11:
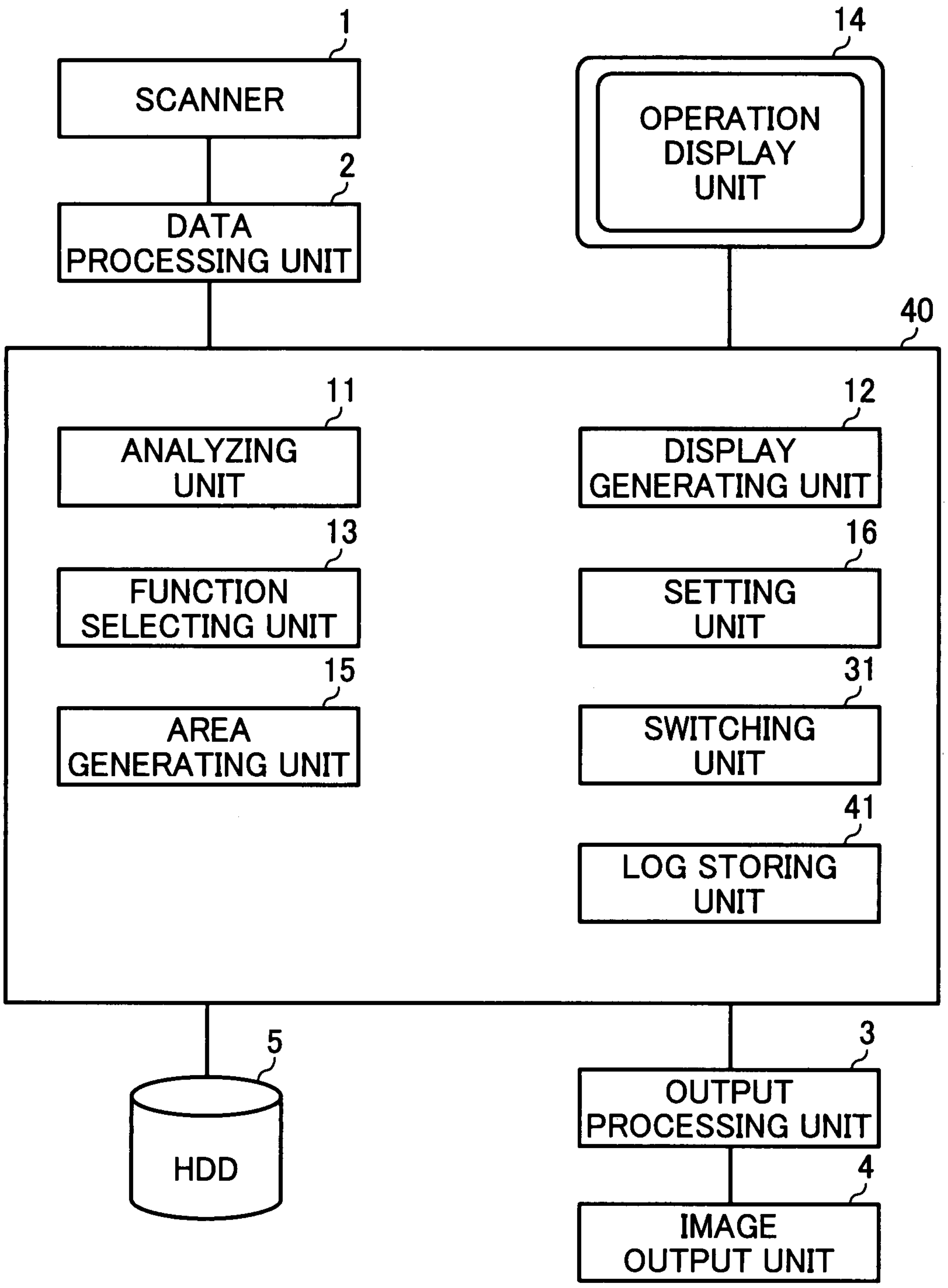
FIG. 11 is a functional block diagram of a user interface device according to a fourth embodiment of the present invention.

FIG. 11 is a functional block diagram of a user interface device 40 according to a fourth embodiment. In addition to components of the user interface device 30, the user interface device 40 further includes a log storing unit 41.

The log storing unit 41 stores therein as log data at least one type of information on an area and a function that the setting unit 16 sets as satisfying user's instruction and information on switching operations.

The switching unit 31 switches between the first interface mode and the second interface mode by referring to the log data stored in the log storing unit 41. The user interface device 40 determines which mode between the first interface mode and the second interface modes is likely to be selected by referring to the log data and switches to the likely mode. Therefore, it is likely to display a screen for the mode that a user desired.

The function selecting unit 13 selects available functions by referring to the log data stored in the log storing unit 41. It means that function items likely to be selected are displayed as priority items when available functions are displayed.

The area generating unit 15 causes the operation display unit 14 to display available areas in a preview by referring to the log data stored in the log storing unit 41. It means that an area likely to be selected is displayed as a priority area when available areas are displayed.

Figure 12:
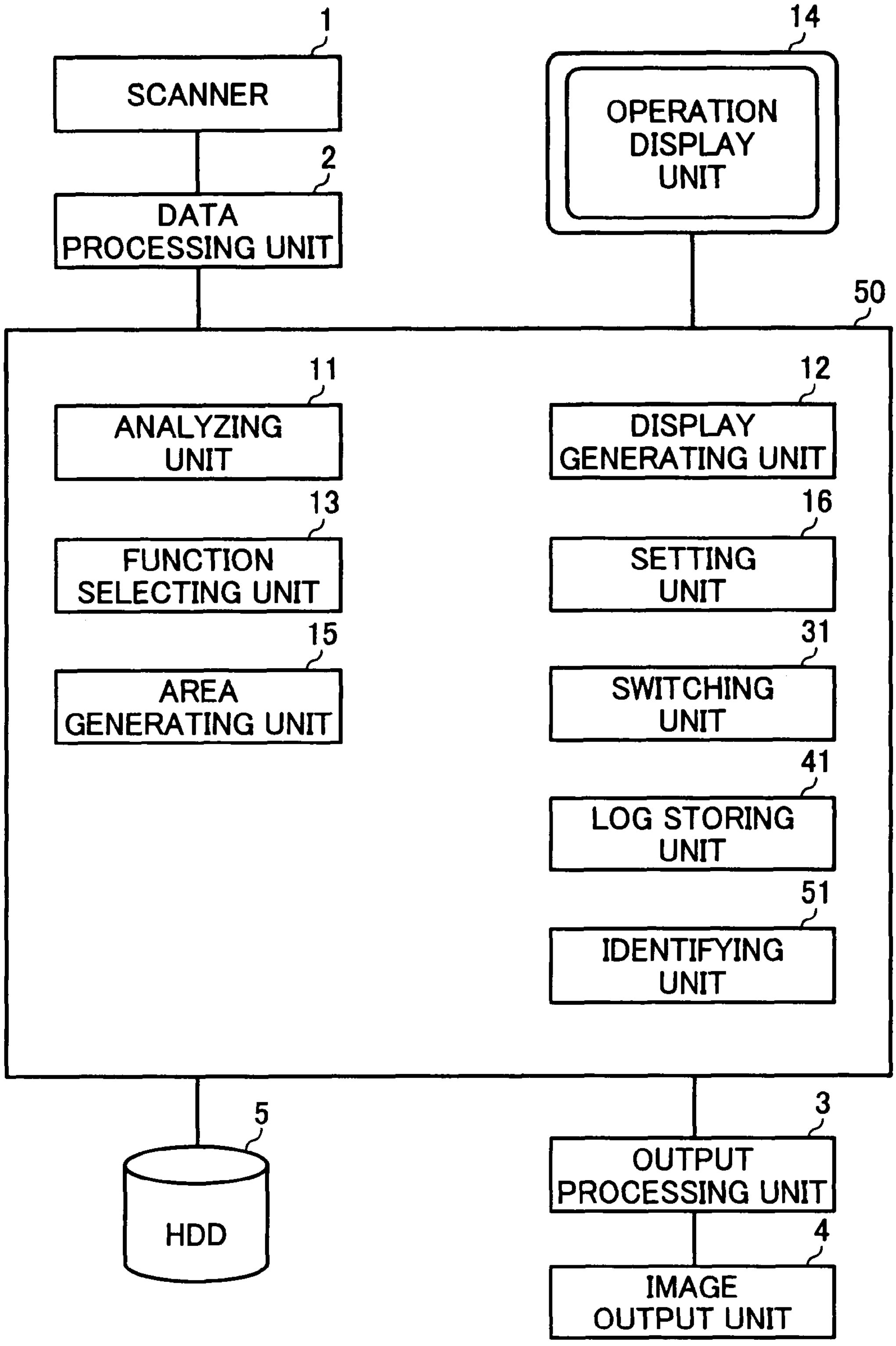
FIG. 12 is a functional block diagram of a user interface device according to a fifth embodiment of the present invention.

FIG. 12 is a functional block diagram of a user interface device 50 according to a fifth embodiment. In addition to components of the user interface device 40, the user interface device 50 further includes an identifying unit 51 for receiving identification data. The log storing unit 41 stores the log data therein relating to the identification data.

In the user interface device 50, the switching unit 31 switches between the first interface mode and the second interface mode by referring to the log data relating to the identification data. It means that, for example, the user interface device 50 identifies a user by receiving the identification data and switches to the mode likely to be selected by the identified user.

The function selecting unit 13 selects available functions to be displayed by referring to the log data relating to the identification data. It means that the user interface device 50 identifies a user by receiving the identification data and displays some functions frequently selected by the identified user as priority items. Therefore, the user interface device 50 displays a function menu suitable for each user.

The area generating unit 15 causes the operation display unit 14 to display available areas by referring to the log data relating to the identification data. It means that the user interface device 50 identifies a user by receiving the identification data and displays areas frequently selected by the identified user as priority areas. Therefore, the user interface device 50 displays available areas arranged suitably for each user.

By including the identifying unit 51 for receiving the identification data and using the log data relating to the identification data, the user interface device 50 displays a sophisticated screen on which available function items and areas are arranged suitably for each user. Therefore, the present invention provides a user-friendly and easy-to-understand user interface device.

Figure 13:
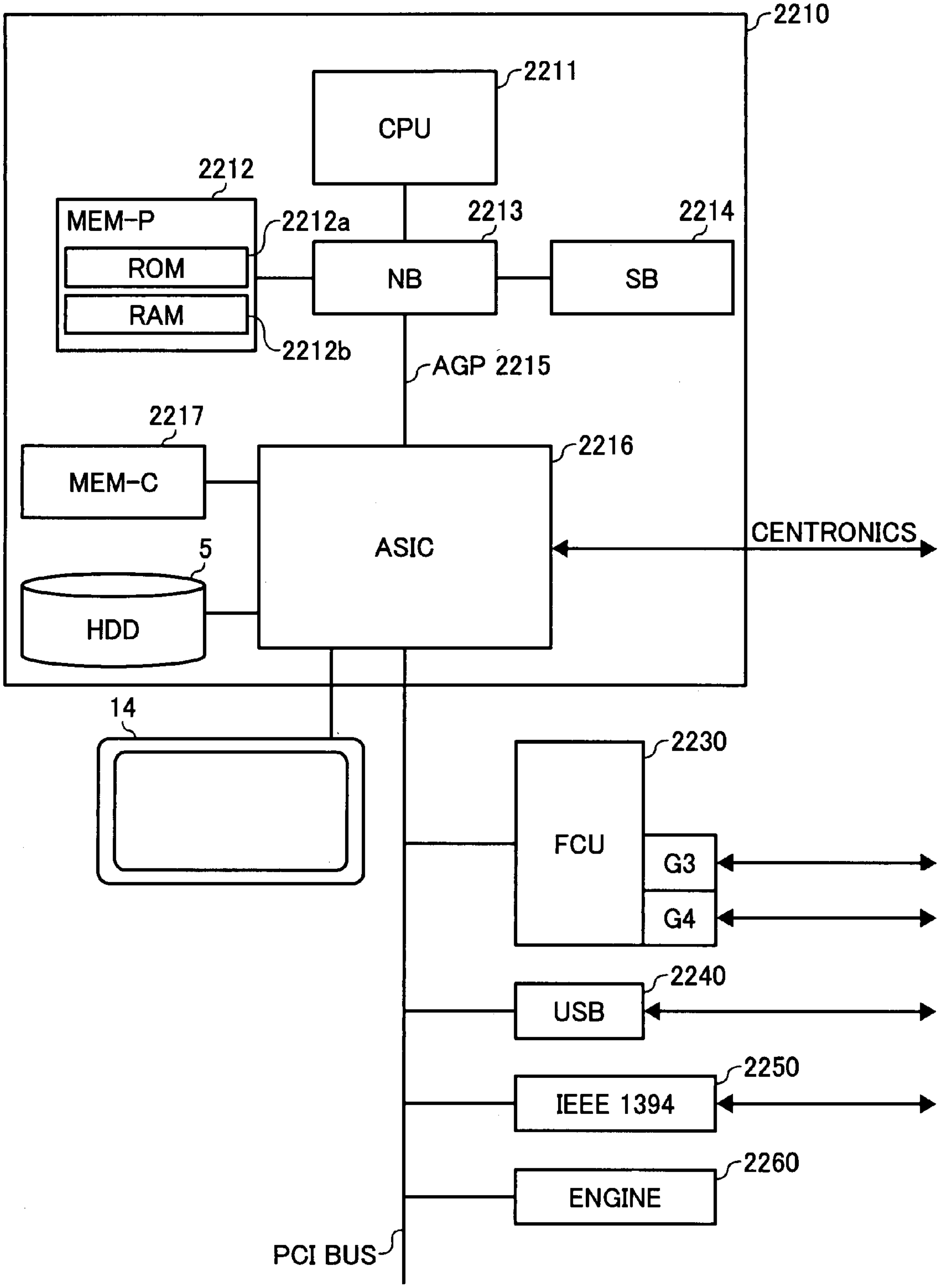
FIG. 13 is a block diagram of a hardware configuration of an image forming apparatus including a user interface device according to the present invention.

FIG. 13 is a block diagram of a hardware configuration of an image forming apparatus including a user interface according to the present invention. The image forming apparatus is a multifunction product (MFP) having various functions of such as a facsimile and a scanner. The MFP includes a controller 2210 and an engine 2260, both connected to each other via a peripheral component interconnect (PCI) bus. The controller 2210 controls the entire MFP, image displaying, image processing, other operations by controlling input from a fun coil unit interface (FCU I/F) 2230 and from the operation display unit 14. The engine 2260 is, for example, an image processing engine connectable to a PCI bus. The engine 2260 performs an image processing such as error diffusion and gamma correction to acquired image data.

The controller 2210 includes a central processing unit (CPU) 2211, a north bridge (NB) 2213, a system memory (MEM-P) 2212, a south bridge (SB) 2214, a local memory (MEM-C) 2217, an application specific integrated circuit (ASIC) 2216, and the HDD 5. The NB 2213 is connected to the ASIC 2216 via an accelerated graphics port (AGP) bus 2215. The MEM-P 2212 includes a read only memory (ROM) 2212*a* and a random access memory (RAM) 2212*b*.

The CPU 2211 controls the entire MFP. The CPU 2211 includes chipsets such as the NB 2213, the MEM-P 2212, and the SB 2214, via which the CPU 2211 is connected to other devices.

The NB 2213 causes the CPU 2211 to be connected to the MEM-P 2212, the SB 2214, and the AGP bus 2215 there-through. The NB 2213 includes a memory controller for controlling read or write operations from or to the MEM-P 2212, a PCI master, and an AGP target.

The MEM-P 2212 is used for storing a computer program or data therein and for expanding a computer program or data thereon. The MEM-P 2212 includes the ROM 2212*a* and the RAM 2212*b*. The ROM 2212*a* is a read only memory, dedicated to store a computer program or data therein. The RAM 2212*b* is a writable and readable memory, which is used for expanding a computer program or data thereon and for drawing an image when image processing is performed.

The SB 2214 causes the NB 2213 to be connected to a PCI device or a peripheral device. The SB 2214 is connected to the NB 2213 via a PCI bus. The PCI bus is connected to another device such as the FCU I/F 2230.

The ASIC 2216 includes a hardware component for multimedia information processing to be used for multimedia information processing. The ASIC 2216 works as a bridge that is connected to the AGP bus 2215, the PCI bus, the HDD 5, and the MEM-C 2217.

An universal serial bus (USB) 2240 and an institute of electrical and electronics engineers 1394 interface (IEEE 1394 I/F) 2250 are connected to the ASIC 2216 via the PCI bus, among a PCI target, an AGP master, an arbiter (ARB) working as a central function of the ASIC 2216, a memory controller for controlling the MEM-C 2217, a plurality of direct memory access controllers (DMAC) for rotating image data by a hardware logic or the like, and the engine 2260.

The MEM-C 2217 is used as an image sending buffer and a code buffer. The HDD 5 stores image data, a computer program, font data, and a form therein.

The AGP bus 2215 is a bus interface for a graphics accelerator card. The AGP is proposed to accelerate graphics processing. The AGP bus 2215 accelerates the graphics accelerator card by directly accessing to the MEM-P 2212 with a high throughput.

The operation display unit 14, which is connected to the ASIC 2216, receives an instruction from a user and sends the instruction to the ASIC 2216.

An image correction program executed by the MFP including an image correcting unit according to any one of embodiments is provided in a form of a ROM or the like with the program stored therein.

The image correction program can be provided in a form of an installable or executable file, which is stored in a computer-readable storage medium such as a compact disk read only memory (CD-ROM), a flexible disk (FD), a compact disk recordable (CD-R), and a digital versatile disk (DVD).

The image correction program can be stored in another computer connected to the computer via a network such as the Internet, and downloaded to the computer via the network. The program can be delivered or distributed via a network such as the Internet.

The image correction program is made up of modules such as the analyzing unit 11, the display generating unit 12, the function selecting unit 13, the operation display unit 14, the area generating unit 15, the setting unit 16, the switching unit 31, the timer 32, and the log storing unit 41. As an actual hardware configuration, the CPU (processor) reads an image processing program from the ROM to execute the program. When the program is executed, the analyzing unit 11, the display generating unit 12, the function selecting unit 13, the operation display unit 14, the area generating unit 15, the setting unit 16, the switching unit 31, the timer 32, and the log storing unit 41 are generated on a main storage unit.

The embodiments and modifications according to the present invention are examples for description. The present invention is not limited to these exemplary embodiments and modifications.

According to an embodiment of the present invention, it is possible to provide a user-friendly and easy-to-understand user interface device. Because the user interface device enables a user to make a series of smooth operations in the first operation displaying mode, that is first receiving an instruction for specifying a target function by displaying available functions, and secondly receiving an instruction for specifying a target area by displaying available areas corresponding to the specified function.

Furthermore, according to an embodiment of the present invention, it is possible to provide a user-friendly and easy-to-understand user interface device. Because the user interface device enables a user to make a series of smooth operations in the second operation displaying mode, that is first receiving an instruction for specifying a target area by displaying areas available for a function, and secondly receiving an instruction for specifying a target function by displaying functions available for the specified area.

Moreover, according to an embodiment of the present invention, it is possible to set parameters by receiving a manual instruction by a user.

Furthermore, according to an embodiment of the present invention, it is possible to switch between in the first operation displaying mode, that is first receiving an instruction for specifying a target function by displaying available functions, and secondly receiving an instruction for specifying a target area by displaying available areas corresponding to the specified function, and the second operation displaying mode, that is first receiving an instruction for specifying a target area by displaying areas available for a function, and secondly receiving an instruction for specifying a target function by displaying functions available for the specified area. Therefore, it is possible to provide a user-friendly and easy-to-understand user interface device.

Moreover, according to an embodiment of the present invention, it is possible to switch the first operation displaying mode and the second operation displaying mode via user's manual operation.

Furthermore, according to an embodiment of the present invention, it is possible, for example, to switch to the second operation displaying mode when there is no input operation by a user in the first operation displaying mode. Therefore, it is possible to provide a user-friendly and easy-to-understand user interface device.

Moreover, according to an embodiment of the present invention, it is possible to switch to the operation displaying mode that is more reasonable in terms of usage so far.

Furthermore, according to an embodiment of the present invention, it is possible to display some function items that are frequently used as priority function items.

Moreover, according to an embodiment of the present invention, it is possible to display some areas that are frequently used as priority areas.

Furthermore, according to an embodiment of the present invention, it is possible to identify a user and display a screen for the operation displaying mode that is more frequently used by the identified user.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for setting a function performed by an image processing apparatus, comprising:

(a) analyzing an input image to recognize one or more document components of the input image;

generating preview data of the input image based on a result of the analysis in (a), and outputting the generated preview data to an operation display unit that displays an image thereon and receives an instruction for specifying a position on the displayed image;

determining one or more function items to be applied to the input image based on the result of said analysis in (a), the one or more function items representing all functions applicable to all of the document components recognized in (a), and selectively outputting the one or more function items to the operation display unit for display together with the preview data on the operation display unit;

receiving a specification of a function item from among the one or more function items displayed on the operation display unit;

selectively generating and displaying indicia of one or more target areas superimposed over the preview data on the operation display unit, wherein each target area amongst the target areas corresponds to the specified function item and indicates a portion of the input image to which the specified function item may be applied;

receiving a specification of a target area from among the target areas displayed on the operation display unit; and generating new preview data that reflects the specified function item processed on specified target area, and outputting generated new preview data to the operation display unit.

2. The method according to claim 1, wherein the receiving a specification of a function item includes receiving a specification of a function item according to an input of text information.

3. The method according to claim 1, wherein the receiving a specification of a target area includes receiving a specification of a target area according to an input of text information.

4. The method according to claim 1, wherein in a case that it is determined that a particular function item is not to be applied for processing any of said document components of the input image, the particular function item is not output to the operation display unit for display together with the preview data.

5. The method according to claim 1, wherein in a case that the document components of the input image include only monochrome document components, then only function items applicable to monochrome document components are selectively output to the operation display unit for display together with the preview data, and function items applicable only to color document components are not output to the operation display unit.

6. The method according to claim 1, wherein in a case that the document components of the input image include only color document components, then only function items applicable to color document components are selectively output to the operation display unit for display together with the preview data, and function items applicable only to monochrome document components are not output to the operation display unit.

7. The method according to claim 1, further comprising:

accessing function-area relational information indicating plural candidate function items applicable to a candidate image and plural candidate target areas corresponding to the plural candidate function items;

determining a first one of the plural candidate function items corresponding to the specified function item; and determining said one or more target areas corresponding to the specified function item as specific ones of the plural candidate target areas corresponding to the first one of the plural candidate function items.

8. A method of setting a function performed by an image processing apparatus, comprising:

switching selectively between a first operation displaying mode and a second operation displaying mode, wherein the first operation displaying mode includes (a) analyzing an input image to recognize one or more document components of the input image;

generating preview data of the input image based on a result of the analysis in (a), and outputting the generated preview data to an operation display unit that displays an image thereon and receives an instruction for specifying a position on the displayed image;

determining one or more function items to be applied to the input image based on the result of said analysis in (a), the one or more function items representing all functions applicable to all of the document components recognized in (a), and selectively outputting the one or more function items to the operation display unit for display together with the preview data on the operation display unit;

receiving a specification of a function item from among the one or more function items displayed on the operation display unit;

selectively generating and displaying indicia of one or more target areas superimposed over the preview data on the operation display unit, wherein each target area amongst the target areas corresponds to the specified function item and indicates a portion of the input image to which the specified function item may be applied;

receiving a specification of a target area from among the target areas displayed on the operation display unit; and generating new preview data that reflects the specified function item processed on specified target area, and outputting generated new preview data to the operation display unit, and the second operation displaying mode includes (b) analyzing an input image to recognize one or more document components of the input image;

generating preview data of the input image based on a result of the analysis in (b), and outputting the generated preview data to an operation display unit that displays an image thereon and receives an instruction for specifying a position on the displayed image;

automatically generating and displaying indicia of one or more target areas superimposed over the preview data on the operation display unit, the target areas indicating all portions of the input image to which function items including finishing items may be applied;

receiving a specification of a target area from among said one or more target areas displayed on the operation display unit;

determining specific ones of said function items including finishing items that may be applied to the specified target area of the input image, and selectively outputting the specific function items including finishing items to the operation display unit for display together with the preview data on the operation display unit;

receiving a specification of a function item from among the function items displayed on the operation display unit; and generating new preview data that reflects specified function item processed on the specified target area, and outputting generated new preview data to the operation display unit.

9. The method according to claim 8, wherein the switching includes switching between the first operation displaying mode and the second operation displaying mode based on an instruction from a user.

10. The method according to claim 8, wherein the switching includes switching between the first operation displaying mode and the second operation displaying mode based on time.

11. The method according to claim 8, further comprising:

storing at least one of information on the specified target area, information on the specified function item, and information on a switching of the operation displaying mode as log data, wherein the switching includes switching between the first operation displaying mode and the second operation displaying mode based on stored log data.

12. The method according to claim 11, wherein the selecting of the second operation displaying mode includes selecting a function item that can be processed on the input image based on the specified target area by referring to the stored log data.

13. The method according to claim 11, wherein the selecting of the first operation displaying mode includes selecting a function item that can be processed on the input image based on the result of the analysis in (a) by referring to the stored log data.

14. The method according to claim 11, further comprising:

receiving identification data for identifying a user, wherein the storing includes storing the log data for each user based on received identification data, and at least any one of the switching, the outputting selected function item, and the displaying a target area includes using the stored log data based on the identitication data.

* * * * *